US008548874B2

(12) United States Patent
Nations et al.

(10) Patent No.: US 8,548,874 B2
(45) Date of Patent: Oct. 1, 2013

(54) INTEGRATED ONLINE AND PHYSICAL LOCATION MERCHANDIZING

(76) Inventors: Gregory M. Nations, Minneapolis, MN (US); Chad R. Gourley, Elk River, MN (US); Patricia Korth-McDonnell, Brooklyn, NY (US); Joe Stewart, Brooklyn, NY (US)

( * ) Notice: Subject to any disclaimer, the term of this patent is extended or adjusted under 35 U.S.C. 154(b) by 156 days.

(21) Appl. No.: 12/973,868

(22) Filed: Dec. 20, 2010

(65) Prior Publication Data
US 2012/0158544 A1 Jun. 21, 2012

(51) Int. Cl.
*G06Q 30/00* (2012.01)
*G06K 19/00* (2006.01)

(52) U.S. Cl.
USPC ........................................ 705/26.61; 235/487

(58) Field of Classification Search
USPC .................................. 705/26–27, 26.1–27.2
See application file for complete search history.

(56) References Cited

U.S. PATENT DOCUMENTS

| | | | |
|---|---|---|---|
| 5,423,139 A | 6/1995 | Feldman | |
| 6,216,139 B1 | 4/2001 | Liston | |
| 6,542,927 B2 | 4/2003 | Rhoads | |
| 6,604,681 B1 | 8/2003 | Burke et al. | |
| 7,010,876 B1 | 3/2006 | Siegel et al. | |
| 7,503,502 B2 | 3/2009 | Montague | |
| 8,001,003 B1 * | 8/2011 | Robinson et al. | 705/14.53 |
| 2006/0103130 A1 | 5/2006 | Koivukunnas et al. | |
| 2007/0095615 A1 | 5/2007 | Spector | |
| 2008/0235085 A1 | 9/2008 | Kovinsky et al. | |
| 2009/0173792 A1 | 7/2009 | Montague | |
| 2009/0265968 A1 | 10/2009 | McNamee | |

FOREIGN PATENT DOCUMENTS
WO WO0145020 6/2001

OTHER PUBLICATIONS

Huge, Target Patents, Target Patent Annotations, PowerPoint Slides, Mar. 28, 2011, 35 pages.
Maldonado, Robert T., Letter to Gardella, Greg H., Re: Inventor Declarations from Huge Inventors, Mar. 31, 2011, 2 pages.
Gardella, Greg H., Letter to Robert T. Maldonado, Re: Huge Inventors for Target Brands, Inc. Patent Applications, Apr. 11, 2011, 5 pages.
Office Action from Canadian Patent Application No. 2,761,936, mailed Jul. 16, 2012 (3 pages).
Just-Style: connecting to consumers, [Online], Sep. 16, 2002, Retrieved from the Internet at: http://www.just-style.com/articleprint.aspx?id=93012 on Dec. 19, 2009, 4 pages.

(Continued)

*Primary Examiner* — Jeffrey A Smith
*Assistant Examiner* — Ethan D Civan
(74) *Attorney, Agent, or Firm* — Merek, Blackmon & Voorhees, LLC (57) ABSTRACT

An on-item tag displays information about an item in a fixed retail location. The on-item tag is associated with an online collage tag for the same item on a web page of a web site associated with a retail location. The on-item tag has an ornamental appearance substantially the same as an online collage tag for the same item displayed on a web page of the web site. The on-item tag has a first part that includes a user review. An online item includes an online collage tag that includes the first part of the on-item tag along with additional information for the product that includes, but is not limited to, user reviews, product cost, product description, product status, and product availability. The on-item tag includes the first part along with a second part that provides additional product information.

20 Claims, 7 Drawing Sheets

(56) References Cited

OTHER PUBLICATIONS

Eddie Bauer.com, [Online], Dec. 20, 2010, Retrieved from the Internet at: https://www.eddiebauer.com/checkout/bag.jsp?&categoryId=95&categoryName=Sweaters--CARDIGANS&pCategoryId=3&pCategoryName=WOMEN&gpCategoryId=1&gpCategoryName=EB#ppl=%7Btype%3A%22transition%22%2CensembleId%3A%2236211%22%2CformatStr%3A%A%22product%22%2CpassedIdObj%3A%7B%22ensembleId%22%3A%2236211%22%7D%2CcategoryId%3A%2227411%22%2CpathInfo%3A%22undefined% on Dec. 20, 2012, 1 page.

Office Action from Canadian Patent Application No. 2,761,936, mailed Apr. 18, 2013 (3 pages).

Office Action from Canadian Patent Application No. 2,761,936, mailed Nov. 21, 2012 (3 pages).

* cited by examiner

INTEGRATED ONLINE AND PHYSICAL LOCATION MERCHANDIZING

BACKGROUND

A bricks-and-mortar retailer sells goods or merchandise from a fixed retail location such as a shop, store, boutique, or kiosk. A customer is an individual that buys the goods or merchandise from the retailer at the fixed retail location.

In a fixed retail location, some products, such as garments, are displayed including hang tags, or swing tickets, affixed to the products. The hang tags, in some examples, are printed paper-based tags, affixed to products in a releasable manner (e.g., using string or thread, plastic fastener, safety pin, etc.). Hang tags include manufacturer-provided hang tags (e.g., including extra buttons, size, and designer logo) and retailer-added hang tags (e.g., including price, size, and sales or clearance indicator). A customer reads the hang tag for information regarding the product.

A customer also buys goods or services from an online retailer that sells goods or merchandise through an online storefront, online shop, or web store. The customer performs online shopping in order to purchase products, goods or services over the Internet. The online retailer provides a web site that includes web pages a customer navigates in order to browse, select and purchase products, goods or services from the online retailer. The online store provides the customer with the physical analogy of buying goods at a bricks-and-mortar retailer.

Web pages are documents or resources of information that are often transferred via the Internet and displayed on web browsers. Many web pages are generated using markup language, for example, hypertext markup language (HTML), which is a text based language for describing graphical documents. Web pages are rendered into a graphical user interface for presentation to a user.

A collection of cohesively designed and implemented web pages is sometimes referred to as a web site. A retail web site includes web pages presenting sales items to users. The sales items may be categorized into departments such as the departments commonly found in a brick-and-mortar retail store. The retail web site, in this case, is designed to allow a user to browse departments of the retail web site in a similar manner to browsing departments in a brick-and-mortar store.

Many retail systems use web pages to provide a personalized experience to a user. Some web pages contain dynamic elements for input and output to provide a rich experience to the user. For example, some retail web pages include a function for submitting a user review related to a sale item. Other users can read the submitted user review to learn more information regarding the item. Another example of a dynamic element includes a control for changing the presentation of the information on a particular web page. If a web page includes multiple sales items, for example, controls can be provided to the user for rearranging the items by price, popularity, or brand.

SUMMARY

In a preferred implementation, a bricks-and-mortar retailer has an associated online store where the online store and a fixed retail location for the retailer sell one or more identical items. An on-item tag may display information about an item in a fixed retail location. The on-item tag is optionally associated with an online collage tag for the same item on a web page of a web site associated with the retail location. The on-item tag, in some embodiments, has an ornamental appearance substantially the same as an online collage tag for the same item displayed on a web page of the web site. For example, the items for sale are garments (e.g., dresses, pants, shirts, etc.).

In some implementations, the on-item tag has a first part that includes a user review. An online item may include an online collage tag that includes the first part of the on-item tag along with additional information for the product that includes, but is not limited to, user reviews, product cost, product description, product status (e.g., new or on sale), and product availability (e.g., in stock at a retail store location). The on-item tag may include the first part along with a second part that provides additional product information such as a specific user review, the total number of user reviews, average user ratings per usage categories (e.g., style, durability, comfort, and overall usage), and general user instructions and information.

The details of one or more implementations are set forth in the accompanying drawing and description below. Other features, objects, and advantages will be apparent from the description and drawings, and from the claims.

DESCRIPTION OF DRAWINGS

Like reference symbols in various drawings indicate like elements.

DETAILED DESCRIPTION OF ILLUSTRATIVE IMPLEMENTATIONS

Figure 1:
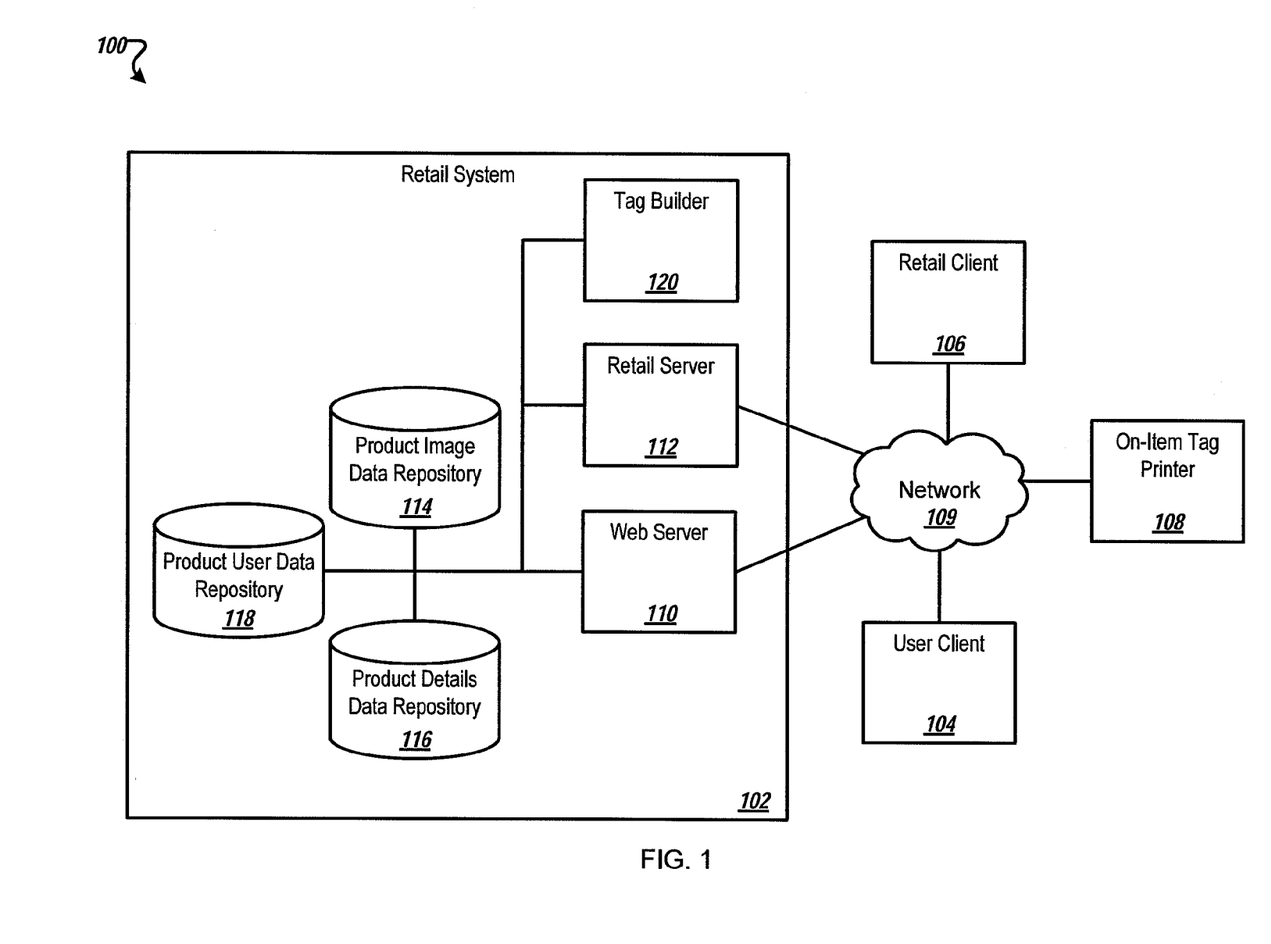
FIG. 1 is a block diagram of an example system for creating online and on-item tags.

FIG. 1 is a block diagram of an example system 100 for creating online and on-item tags. For example, the system 100 creates online collage tags for placement on products (goods or merchandise) displayed on an online resource such as a product web page. The displayed products, for example, are offered for sale through an online storefront associated with a retail enterprise. Additionally, the system 100 creates on-item tags for placement on products sold in various retail locations.

The system 100 includes a retail system 102 that generates online and on-item tags, a user client 104 that includes a client browser to display web pages, a retail client 106 to communicate with the retail system 102, and an on-item tag printer 108 to print on-item tags (e.g., hang tags or swing tickets) for placement on products in retail locations. A network 109 communicatively connects the retail system 102, the retail client 106, the user client 104 and the on-item tag printer 108. The network 109 is a system that passes data and/or communications between the connected systems. The network 109, in some examples, includes the Internet, local area networks, wireless networks, and cellular data networks.

The retail system 102 includes a web server 110. The web server 110 serves content such as webpages, documents, and files. The web server 110 delivers data through various protocols including hypertext transfer protocol (HTTP) and file transfer protocol (FTP).

The retail system 102 includes a retail server 112. The retail server 112 serves content such as documents and files for the retail system 102. The content, for example, includes data specific to each product sold by the retailer both online and in a retail store location. The retail server 112 uses the content to generate online tags and on-item tags for the products using a tag builder 120.

The retail system 102 includes product repositories 114, 116, 118. A product image data repository 114 stores images of products sold by the online retailer through the retail system 102. For example, the product image data repository 114 stores an image of a sleeveless checked dress for sale by the online retailer that is displayed to a viewer on a product web page. A product details data repository 116 stores details for each product sold by the online retailer through the retail system 102. The details, in some examples, include but are not limited to price, name, category, and options. For example, the product details data repository 116 stores the price for the sleeveless checked dress. In addition, the product details data repository 116 stores information as to the availability of the sleeveless checked dress in one or more fixed retail locations. A product user data repository 118 stores user ratings and reviews for the products sold by the online retailer through the retail system 102. Specifically, the user ratings and reviews are for products sold on the web site of the online retailer. For example, online user votes and ratings are collected through one or more web pages of the web site including interactive controls for user input. In some cases, the same product sold online is also sold in a fixed retail location. Therefore, the user ratings and reviews are also optionally applied to the in store item. For example, the product user data repository 118 stores user ratings and reviews for the sleeveless checked dress.

The tag builder 120, included in the retail system 102, generates an online tag for an item. The online tag is displayed on a product web page along with the item. The online tag includes user ratings and reviews gathered from data stored in the product user data repository 118, arranged in an aesthetically pleasing and eye-catching graphical format. The web server 110 uses data from the product image data repository 114, the product details data repository 116, the product user data repository 118, and the tag builder 120 to generate and/or serve product web pages.

The design of the online tag, in some implementations, varies depending upon the use of the online tag. For example, an online tag for a baby outfit includes a pastel design in the shape of a baby item, such as a rattle, while an online tag for a summer dress includes a sun design.

In some implementations, the web server 110 coordinates the contents of the product web pages to harmonize information gleaned from the product user data repository 118 to the information displayed on the online tag. In one example, information collected from the product user data repository 118 is locked to a snapshot timestamp associated with the time at which the online tag was created. Any subsequently-submitted user data, for example, is blocked from inclusion in the harmonized product web page.

The user client 104 includes a web browser for retrieving, presenting, and traversing information resources, including those served by the retail system 102. The user client 104, using the web browser, receives web pages, documents, and files, which are rendered for display to a user. For example, the web browser on the user client 104 receives a product web page that displays one or more items for sale by an online retailer where one or more of the items optionally include an online tag.

In some implementations, a user uses the web browser on the user client 104 to browse the retail web site. The user, for example, navigates to one or more web pages to enter votes and ratings for products sold by the online retailer on the retail web site. The user votes and ratings are stored in the product user data repository 118.

The retail client 106 is a client for requesting, retrieving, presenting, and traversing information from information resources served by the retail system 102. For example, a user of the retail client 106 requests the creation and printing of an on-item tag for a specific item in a retail store location from the retail system 102. In some implementations, the user provides requirements or design choices for the on-item tag such as, in some examples, a color, graphic, perimeter shape, size, or material construction. For example, a user of the retail client 106 is presented with various options when developing a desired on-item tag. The design of the on-item tag, in some implementations, can vary from store-to-store for the same online product. For example, one store selects a Halloween-themed on-item tag for a particular sweater, while another store selects a Fall-themed on-item tag for the same sweater.

The retail server 112 uses the tag builder 120 to generate an on-item tag for the specific item. The on-item tag includes user ratings and reviews gathered from data stored in the product user data repository 118. The tag builder 120 generates an on-item tag having an ornamental appearance substantially identical to an online collage tag for the same item. In some implementations, the tag builder 120 generates a coordinating online tag for any on-item tag requested by the retail client 106. For example, the coordinated online tag can be used to harmonize the appearance of the product web page with the information provided to the shopper at the physical store. The retail server 112 serves the on-item tag to an on-item tag printer 108 for printing. In some implementations, the retail server 112 serves the on-item tag to the retail client 106, which then transfers the online tag to the on-item tag printer 108 for printing. The user then affixes the on-item tag to the item in the retail store location.

The on-item tag printer 108, in some implementations, prints a variety of styles of on-item tags. In some implementations, the on-item tag printer 108 is capable of printing various sizes and designs of one or more of a paper hang tag, soft PVC hang tag, sticker, and tags composed of other materials conducive to being releasably affixed to a product. The materials and style, for example, depend in part upon the item to which the on-item tag will be affixed. A garment on-item tag, in some implementations, differs from a toy on-item tag or a toaster on-item tag.

In some implementations, the retail client 106 and the on-item tag printer 108 are in the same location as the item for tagging. In some implementations, the retail client 106, the on-item tag printer 108, and the item for tagging are in separate locations, requiring the printed on-item tags to be delivered to the location of the items for tagging. In some implementations, the on-item tag printer 108 and the item for tagging are located in the same facility (e.g., a retail store, a warehouse) and the retail client 106 is located in another facility (e.g., a corporate headquarters, a regional sales center).

Figure 2:
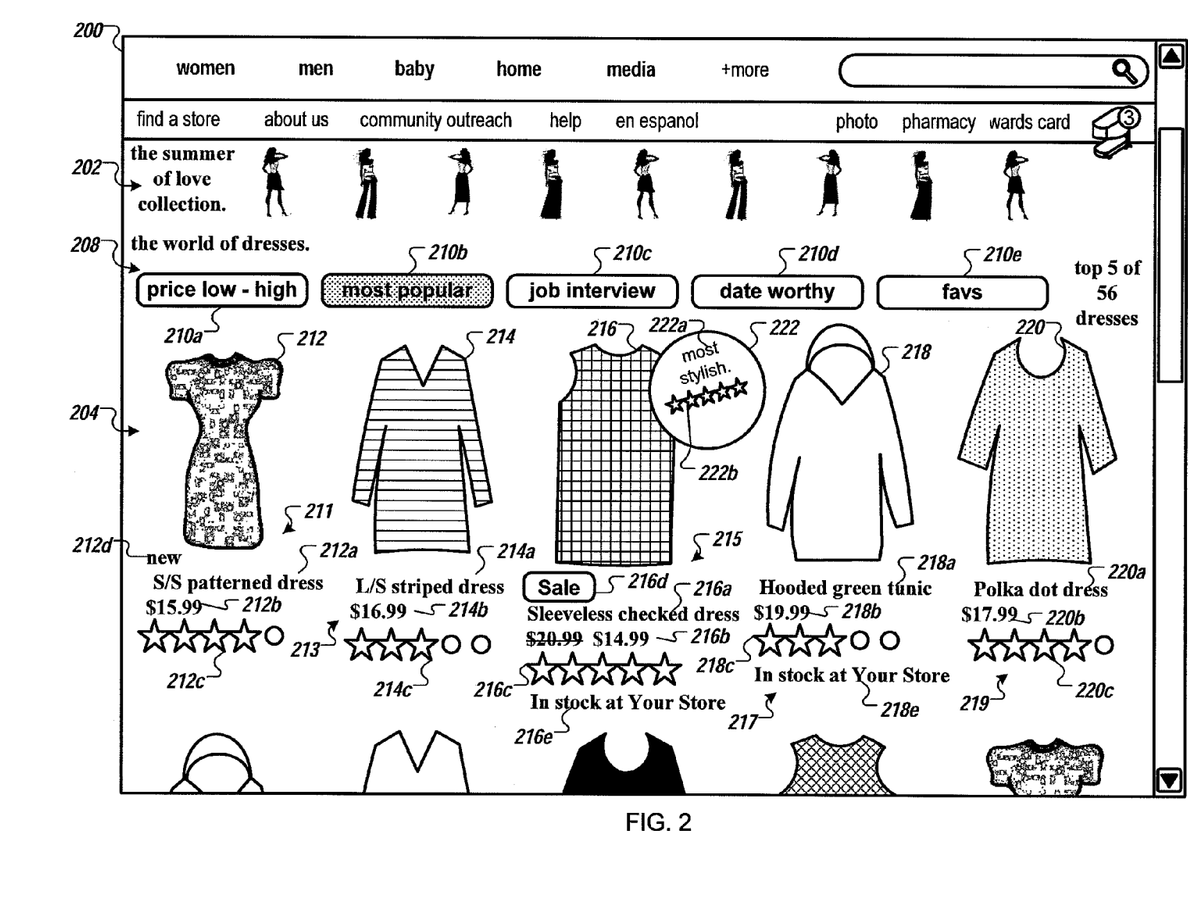
FIG. 2 shows an example retail web page for a retail web site.

FIG. 2 shows an example retail web page 200 for a retail web site. The retail web page 200 displays items for sale in a sales presentation area. The items are available from the online retailer through the retail web site. In some cases, the online retailer is also a bricks-and-mortar retailer where some or all of the items displayed for sale on the retail web page 200 are also available for sale in one or more retail store locations. For example, referring to FIG. 1, a user of the user client 104 accesses and views the retail web page 200 in a client browser running on the user client 104.

A product collection display area 202 includes images of items for sale within an identified collection of items (e.g., "the summer of love collection—the world of dresses"). An individual item display area 204 displays each item for sale in the identified collection of items. A scrollbar 206 enables a user to view each individual item in the identified collection on the retail web page 200. A product category selection area 208 includes product category selection controls 210a-210e (e.g., buttons) that allow a user to select the product category by which to sort the items included in the collection for display on the retail web page 200. For example, the selection of the most popular button 210b sorts the display of the items in the collection on the retail web page 200 from most popular to least popular (e.g., most items purchased to least items purchased). Other categories include, for example, price sorting from low to high 210a, job interview appropriate garments 210c (e.g., as determined through a user voting poll or as designated by the designers of the retail web site), date worthy garments 210d (e.g., as determined through a user voting poll or as designated by the designers of the retail web site), and favorite items 210e (e.g., as determined by statistics regarding the most frequently viewed item page, the most frequently purchased item, the most frequently reviewed item, or a combination thereof).

The example retail web page 200 shows online items 212, 214, 216, 218, 220 as available for sale online from the online retailer. Each online item 212, 214, 216, 218, 220 has associated with it a product description area 211, 213, 215, 217, 219, respectively, that includes an item name 212a, 214a, 216a, 218a, 220a, an item price 212b, 214b, 216b, 218b, 220b, and an item overall user rating 212c, 214c, 216c, 218c, 220c as designated by a number of stars out of five stars. Additionally, the product description area includes an item status 212d, 216d for online items 212, 216, respectively. In some examples, the item status indicates if an item is on sale, part of another promotion, or new to the collection.

In the case where the online retailer is also a bricks-and-mortar retailer, an item displayed on the retail web page 200 optionally includes an indication as to its availability in a retail store location (online items 216, 218 and in-store indicators 216e, 218e, respectively). Specifically, the in-store availability regards a retail store location selected by or otherwise associated with the user browsing the retail web site (e.g., "Your Store").

A customer review area of the retail web page 200 displays an online tag 222 (e.g., graphical element related to a customer review) that is associated with online item 216. The online tag 222 includes a customer voting result 222a and an average customer rating 222b. The ornamental appearance of the online tag is the same as a first region of an on-item tag. In some implementations, the online tag 222 is generated at the same time as a coordinated on-item tag. The online tag 222, in other implementations, is generated on a scheduled basis (e.g., upon a change in user ratings, every twelve hours, once a week, etc.).

The online tag 222, in some implementations, is included on a product-specific web page as well as on the retail web page 200. For example, upon selecting the item 216, a product-specific web page is served to the user including an online tag similar to the online tag 222. For example, the online tag provided on the product-specific web page is sized at the same or a different aspect ratio. In some implementations, the web server 110 ensures that the online tag 222 and an online tag presented on the product-specific web page contains identical information. For example, a time stamp comparison or a time stamp lock is used to harmonize the online tag 222 with the online tag presented on the product-specific web page.

Figure 3:
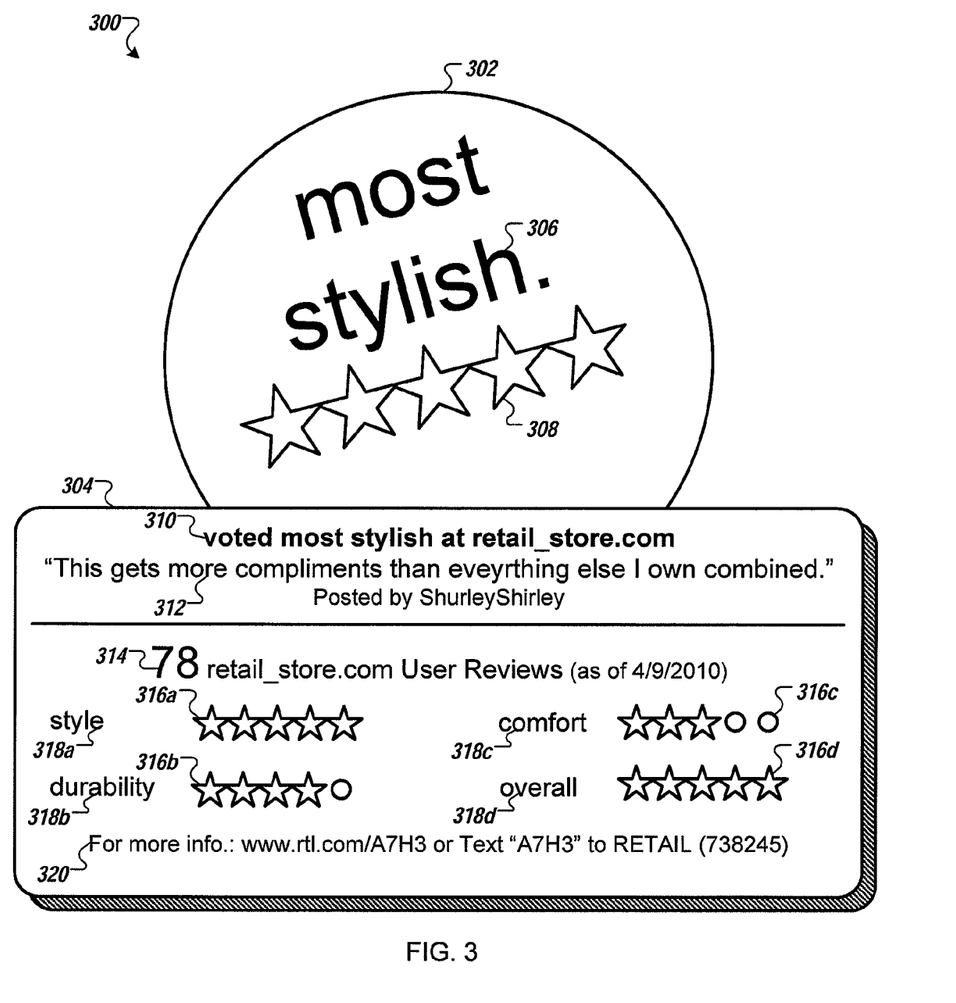
FIG. 3 shows an example on-item tag.

FIG. 3 shows an example on-item tag 300. The on-item tag 300 includes a first region 302 and a second region 304. The first region 302 includes a polling result including a user voting result 306 and an overall user rating 308. As shown with reference to FIG. 2, the first region 302 is ornamentally substantially identical to the online tag 222. The on-item tag 300 includes the second region 304 that includes a user review result. Specifically, the second region 304 includes an online user voting result 310, which states how users of the retail web site voted the item (e.g., "most stylish"). The second region 304 includes an example product review 312, which is a direct quote of a review of the item by a user. In some implementations, the example product review 312 is selected automatically, for example, based upon results of a review polling feature (e.g., ten out of ten visitors voted that this review is helpful) or as the most recently posted positive (e.g., five star) review. In some implementations, a user manually selects a review to be used in the example product review 312, authorizes the use of an automatically selected review, or selects a subset of an automatically selected user review (e.g., the third sentence of an eight-sentence review). The second region 304 includes a total number of user reviews indicator 314, which shows the number of user reviews for the item on the retail web site as of a certain date. The second region 304 includes user ratings 316a-d for user review categories 318a-d, respectively. The second region 304 includes user instructions 320, which provide information to a user to allow the user to access further information about the item. For example, additional information is provided on a specific web page or in a SMS text message.

In some implementations, the user instructions 320 include a URL pointing to a snapshot product web page. For example, the state of the user reviews, ratings, and other information displayed upon the on-item tag 300 can be kept synchronized with the snapshot product web page. For example, the information available on the certain date indicated by the user reviews indicator 314 is preserved or regenerated such that the on-item tag 300 and the snapshot product web page more or less correlate to each other. The snapshot product web page, in some implementations, includes an online tag harmonized to the visual layout and information displayed on the on-item tag. For example, the online tag is generated and stored by the tag builder 120 (described in relation to FIG. 1) along with the on-item tag 300 (e.g., on the certain date indicated by the user reviews indicator 314). In another example, the online tag is generated at a later time using stored information associated with the on-item tag 300 (e.g., a timestamp and, optionally, a selected user review). Although the snapshot web page includes some historical data, other information is current. For example, the snapshot web page presents current data related to a promotion applied to the product associated with the on-item tag 300 or the availability of the on-item tag 300.

If the user instructions 320 include an SMS text message, in some implementations, the system responds with a graphical message including an online tag harmonized in style to the on-item tag 300. Other information included in the SMS text message, for example, is similar to that described in relation to the snapshot product web page.

In other implementations, the user instructions 320 point the reader to a resource including the most current information, such as a product web page providing details of the product described by the on-item tag 300.

Figure 4:
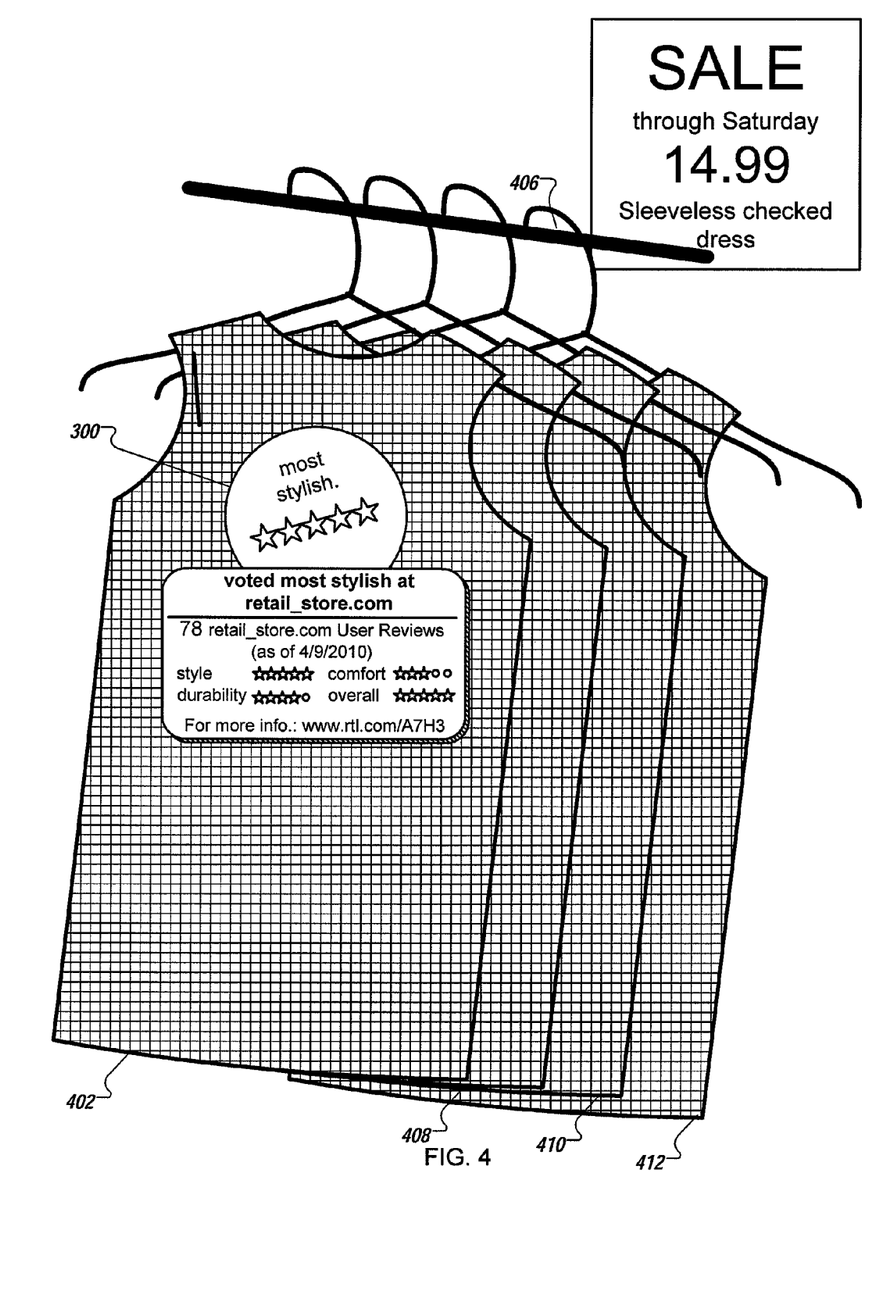
FIG. 4 shows an example item with an on-item tag in a retail store location.

FIG. 4 shows an example retail item 402 in a retail store location with the on-item tag 300 attached. The retail item 402 in FIG. 4 is the same item shown on a product web page for the online retailer (item 216 shown in FIG. 2). The retail item 402 is on a rack 406 along with additional similar retail items 408, 410, 412 (e.g., the same item in different sizes). The on-item tag 300, in some examples, is releasably affixed to the retail item using string or thread, a plastic fastener, or a safety pin. In another example, the on-item tag 300 is a sticker applied to the fabric of the retail item 402.

Figure 5:
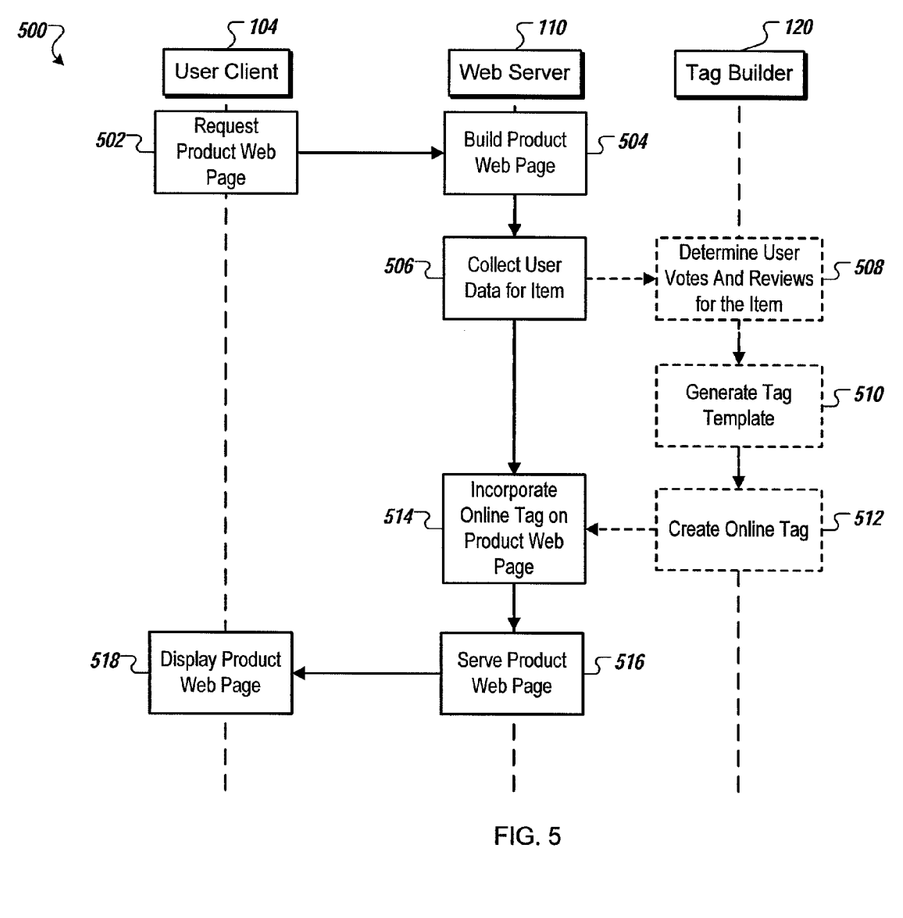
FIG. 5 is a swim lane diagram of an example method of creating an online tag.

FIG. 5 is a swim lane diagram of an example method 500 of creating an online tag. The user client 104 requests a product web page (502), for example, in response to input from a user that navigated to the product web page interested in purchasing an item (e.g., a dress) on the product web page from the online retail web site. In another example, the requested web page includes a URL provided to the user on an on-item tag.

The web server 110 builds the requested product web page (504). The web server 110 collects user data for the items on the product web page (506). For example, the web server 110 collects information about the status, cost, and user ratings for the item. If the requested product web page is associated with an on-item tag, in some implementations, the web server 110 collects time-stamped information coordinated with the contents of the on-item tag. For example, an online tag, user ratings, or user reviews are collected using the date of the creation of the on-item tag to harmonize the information between the requested web page and the on-item tag.

If desired, the web server 110 optionally provides the collected user data to the tag builder 120 for creation of one or more online tags. In one example, if a product featured in the requested product page is determined to currently be ranked highest in a user polling category and an online tag has not already been generated for the product, the web server 110 requests generation of an online tag. In another example, if a product featured in the requested product page is associated with an online tag, but the information provided on the online tag is not up-to-date (e.g., the user rating has been adjusted by additional user votes since the time of the generation of the online tag), the web server 110 requests that the tag builder 120 create a new online tag.

The tag builder 120 determines user votes and reviews associated with the item (508). For example, the tag builder 120 selects information from the user data desired for presentation on the online tag.

The tag builder 120 generates a tag template for the online tag(s) (510). The tag template, in some implementations, includes a graphical design selected for the online tag, such as a desired color, shape, or graphical image (e.g., shamrock, strawberry, cloud, etc.). The tag template, in one example, coordinates with an ongoing promotion. For a back to school sale, for example, the tag template is in the shape and color of an apple.

The tag builder 120 creates the online tag(s) for the item using the selected user data and the tag template (512). Selected data is merged with the tag template to create the design of each of the online tags. Each online tag is saved in a format for presentation, such as a digital image file format. In some implementations, the online tag includes an interactive or multimedia component, such as an audible portion activated on mouse-over. In this circumstance, the online tag is stored in an appropriate file format such as a digital animation file or applet function.

The tag builder 120 provides the online tags for the items to the web server 110, which incorporates the online tags onto the product web page with the corresponding items (514). The web server 110 serves the product web page to the user client (516).

The user client 104 displays the product web page with the online tags for the items (518). An example of a product web page is shown with reference to FIG. 2. The online collage tags include online tag 222 as well as the product description areas 211, 213, 215, 217, 219, associated with each online item 212, 214, 216, 218, 220, respectively.

Figure 6:
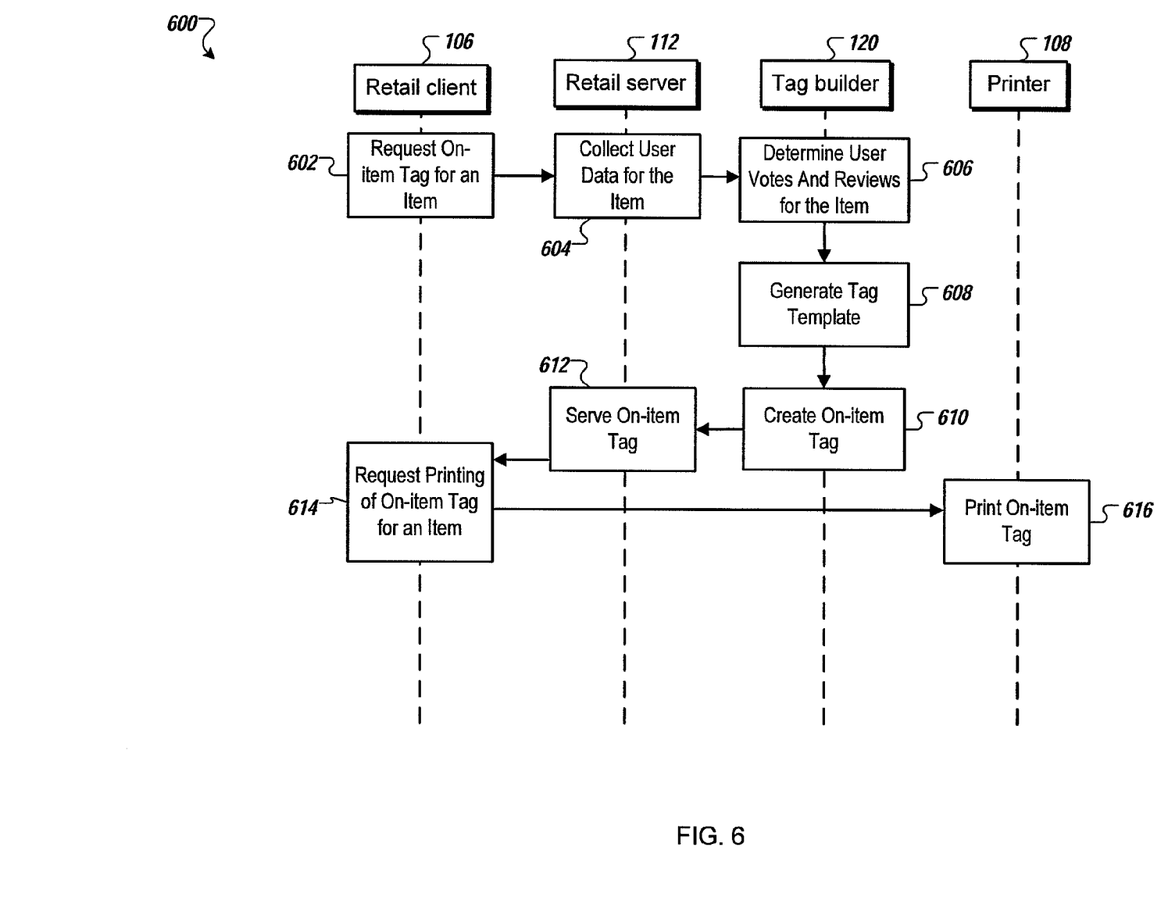
FIG. 6 is a swim lane diagram of an example method of creating an on-item tag.

FIG. 6 is a swim lane diagram of an example method 600 of creating an on-item tag. The retail client 106 requests an on-item tag for an item (602), for example, in response to a request to label particular garments (e.g., dresses) with on-item tags before placing them on a rack in a retail store. The request, in some implementations, includes on-item tag template information, such as a color, size, exterior shape, or graphic design of the on-item tag. The materials (paper, PVC, cardboard) or attachment method (e.g., sticker, thread, plastic tag, etc.) are optionally provided.

The retail server 112 collects user data for the particular item (604). For example, the retail server 112 collects user reviews and ratings for the item. If desired, the retail server 112 optionally provides collected user reviews to the retail client for selection of a desired quote for the on-item tag. The retail server 112 provides the collected user data to the tag builder 120.

The tag builder 120 determines user votes and reviews for the item for placement on the on-item tag (606). In some implementations, the tag builder 120 provides one or more identified user reviews to the retail server 112. The retail server 112, for example, shares the identified user reviews with the retail client 106, where a user has the option to approve, disprove, select, or modify (e.g., select a portion of) a user review for presentation on the on-item tag.

The tag builder 120 generates a tag template for the on-item tag (608) and creates an on-item tag for the item using the selected user data (610). This process, for example, is similar to the tag template generation and online tag creation process of steps 510 and 512, as described in relation to FIG. 5. In some implementations, in addition to the on-item tag, the tag builder 120 generates a coordinating online tag. The online tag, in some implementations, is included as a portion of the on-item tag. For example, the design of the tag generated by the tag builder 120 is used for printing an on-item tag as well as for presenting an online tag.

The tag builder 120 provides the on-item tag for the item to the retail server 112, which serves the on-item tag to the retail client (612). The retail client 106 requests printing of the on-item tag (614). For example, the retail client 106 selects an appropriate remote site for printing the on-item tags, or the retail client 106 selects a local printer. In some implementations, the retail server 112 serves the on-item tag directly to the on-item tag printer 108 for printing.

The on-item tag printer 108 prints the on-item tag (616). The on-item tag is printed on an appropriate material for attachment to a retail item. In one example, the on-item tag is printed on a heavy perforated paper board. An example of an on-item tag is shown with reference to FIG. 3.

Figure 7:
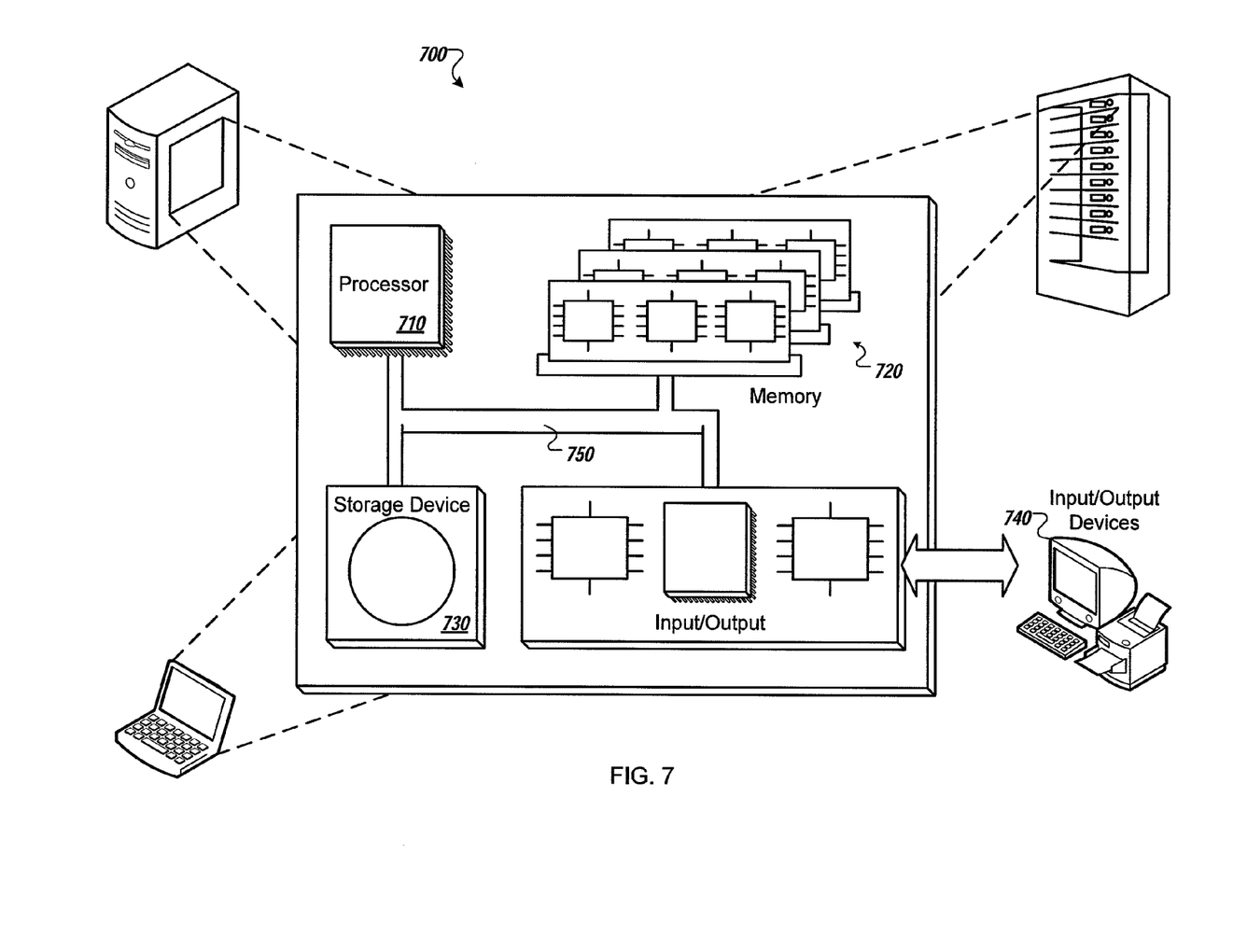
FIG. 7 is a block diagram of a computing system optionally used in connection with computer-implemented methods described in this document.

FIG. 7 is a schematic diagram of a generic computer system 700. The system 700 is optionally used for the operations described in association with any of the computer-implemented methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 is optionally a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

In some examples, the features described are implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features, in some instances, are implemented on a computer having a display device such as a CRT (cathode ray tube) or LCD (liquid crystal display) monitor for displaying information to the user and a keyboard and a pointing device such as a mouse or a trackball by which the user provides input to the computer.

The features are optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications are optionally made without departing from the spirit and scope of this disclosure. Accordingly, other embodiments are within the scope of the following claims.

What is claimed is:

1. An on-item tag for a retail item located in a physical retail store operated by an enterprise, the tag comprising:
   a first region including a first graphic and conveying a polling result in human readable form, the first graphic corresponding substantially to a second graphic contemporaneously viewable on a retail web site associated with the enterprise, the second graphic forming at least a portion of an online tag, the online tag being contemporaneously viewable adjacent a third graphic displaying the retail item on the retail web site; and
   a second region including a fourth graphic and conveying a product review in human readable form, the product review being contemporaneously viewable on the retail web site operated by the enterprise,
   wherein
   the polling result and the product review for the retail item are obtained from a retail system operated by the enterprise and
   the polling result represents data collected in part through the retail web site.

2. The on-item tag of claim 1, wherein the retail item is a garment.

3. The on-item tag of claim 1, wherein the online tag has substantially the same ornamental appearance as the first region of the on-item tag, the second region of the on-item tag including indicia directing a user to a snapshot product web page, the snapshot product web page including the online tag, the third graphic and the product review, the snapshot product web page being configured such that if a user accesses the snapshot product web page after a date the on-item tag was created, the product review conveyed by the snapshot product web page is the same as the product review conveyed by the on-item tag.

4. The on-item tag of claim 1, wherein the polling result includes a user voting result and an average user rating.

5. The on-item tag of claim 1, wherein the polling result includes one or more of an example user review, a total number of user reviews indicator, an online user voting result, one or more user instructions, and one or more user review categories, wherein each respective review category has an associated user rating.

6. The on-item tag of claim 5, wherein the on-item tag includes, in human readable form, an example user review, a total number of user reviews indicator, an online user voting result, one or more user instructions, and a plurality of user review categories, wherein each respective review category has an associated user rating, the one or more user instructions include a universal resource locator of a web page of the retail web site.

7. A method for creating an on-item tag, the method comprising:
   selecting an item from one or more items available for sale through a retail web site and in a retail store location associated with the retail web site;
   determining user review results for the item, the results gathered from online user votes and ratings for the item entered by users on one or more web pages of the retail web site;
   creating a first region of the on-item tag, the first region including content comprising a polling result for the item in human readable form;
   displaying the first region of the on-item tag as an online tag, the online tag presented with a graphic of the item on a retail web page of the retail web site;
   creating a second region of the on-item tag, the second region including content comprising a user review result for the item in human readable form; and
   printing the on-item tag, wherein the on-item tag includes the first region and the second region.

8. The method of claim 7, wherein the on-item tag is a sticker affixed directly to the item.

9. The method of claim 7, further comprising displaying a selected review along with the graphic of the item and the first region on the retail web page, the selected review being selected from the one or more user reviews for the item, the selected review and the first region combining to form an online collage tag for the item.

10. The method of claim 7, wherein the polling result comprises a user voting result and an average user rating.

11. The method of claim 8, wherein the user review result comprises, in human readable form, an example user review, a total number of user reviews indicator, an online user voting result, one or more user instructions, and one or more user review categories, and
   a user rating is associated with each of the one or more user review categories.

12. The method of claim 11, wherein the one or more user instructions include a universal resource locator of an item-specific web page presenting information regarding the item.

13. A method for creating an on-item tag, the method comprising:
   selecting an item from one or more items available for sale through a retail web site and in a retail store location associated with the retail web site;
   determining user review results for the item, the results gathered from online user votes and ratings for the item entered by users on one or more web pages of the retail web site;
   creating a first region of the on-item tag, the first region including content comprising a polling result for the item in human readable form;
   creating a second region of the on-item tag, the second region including indicia directing a user to a snapshot product web page, the snapshot product web page including the first region of the on-item tag displayed as an online tag adjacent a pictorial graphic of the item, the snapshot product web page further including a polling result for the item, the snapshot product web page being configured such that if a user accesses the snapshot product web page after a date the on-item tag was created, the polling result conveyed by the snapshot product web page is the same as the polling result conveyed by the on-item tag; and
   printing the on-item tag, wherein the on-item tag includes the first region and the second region.

14. The method recited in claim 13 including the further steps of:
   forming the on-item tag as a sticker and directly affixing the on-item tag to the item.

15. The method recited in claim 13, wherein the first region and the second region are formed from paper.

16. The method recited in claim 13, further including the steps of:
   providing a tag builder used to create an on-item tag and an online tag; and,
   using the tag builder to create an on-item tag for a first item and an online tag for the first item at substantially the same time.

17. The method recited in claim 13, further including the steps of:
   providing a tag builder used to create an on-item tag and an online tag; and,
   using the tag builder to create an on-item tag for a first item at a first time, the on-item tag conveying a first polling result;
   subsequently using the tag builder to create an online tag for the first item conveying the first polling result conveyed by the on-item tag for the first item even though at the time of creating the online tag the first polling result changed.

18. The method as recited in claim 13, wherein the second region of the on-item tag includes, in human readable form, an example user review, a total number of user reviews indicator, an online user voting result, one or more user instructions, and one or more user review categories, and
   a user rating is associated with each of the one or more user review categories.

19. The method of claim 18, wherein the one or more user instructions include a universal resource locator of the snapshot product web page.

20. The method recited in claim 13, further including the steps of:
   providing a tag builder to create an on-item tag conveying a first set of information regarding user reviews and an online tag conveying the first set of information regarding user reviews even when the online tag is created after the on-item tag and the information regarding user reviews changed at a time when the online tag is created.

* * * * *